United States Patent
Silberstein

(10) Patent No.: US 8,276,022 B2
(45) Date of Patent: Sep. 25, 2012

(54) EFFICIENT FAILURE DETECTION FOR LONG RUNNING DATA TRANSFER JOBS

(75) Inventor: Adam E. Silberstein, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 190 days.

(21) Appl. No.: 12/771,906

(22) Filed: Apr. 30, 2010

(65) Prior Publication Data

US 2011/0271145 A1 Nov. 3, 2011

(51) Int. Cl.
*G06F 11/00* (2006.01)
(52) U.S. Cl. .............. 714/43; 714/18; 714/47.2; 714/56
(58) Field of Classification Search .................. 714/4.1, 714/18, 20, 43, 47.1, 47.2, 56; 709/232, 709/234, 235
See application file for complete search history.

(56) References Cited

U.S. PATENT DOCUMENTS

| | | | | |
|---|---|---|---|---|
| 7,721,280 | B1 * | 5/2010 | Frisbie et al. | 717/172 |
| 2002/0049853 | A1 * | 4/2002 | Chu et al. | 709/237 |
| 2002/0095454 | A1 * | 7/2002 | Reed et al. | 709/201 |
| 2006/0069803 | A1 * | 3/2006 | Clark et al. | 709/237 |

* cited by examiner

*Primary Examiner* — Joseph D Manoskey
(74) *Attorney, Agent, or Firm* — Weaver Austin Villeneuve and Sampson LLP

(57) ABSTRACT

Disclosed are methods and apparatus for error handling within jobs that utilize a plurality of tasks for data transfer of individual data records to a storage destination. For each task, one or more failed records may be logged to a file for later insertion. If a high percentage of a task's output (e.g., writes to another data storage system) is determined to be failing, the task short-circuits itself. Each task is also configured to perform checkpoint logging as the task completes work. If the entire job later short-circuits and is to be restarted, the restarted job only repeats a minimal amount of previously completed work for the tasks which have not already completed their data insertions. Together, these techniques can ensure that in the face of periodic failures, the job completes long-running job in a minimal time with minimal effects.

18 Claims, 4 Drawing Sheets

EFFICIENT FAILURE DETECTION FOR LONG RUNNING DATA TRANSFER JOBS

BACKGROUND OF THE INVENTION

The present invention relates to data processing systems, and more specifically to large-scale, long-running data transfer to data storage systems.

Large Internet companies such as Yahoo!, Inc. continuously generate, process, and transfer an enormous amount of data, including user data and web page data, from web searches to social relationships to geo-location data, and system data such as various performance metrics. Deriving useful information from the large volume of raw data supports a variety of service objectives, including presenting relevant contextual information, identifying trends in user behavior, and offering better targeted services.

Improved mechanisms for more efficiently handling large amounts of data would be beneficial.

SUMMARY OF THE INVENTION

Apparatus and methods for handling errors during a data transfer are disclosed. In one embodiment, a computer implemented method of handling errors during a data transfer is disclosed. For a first task that is configured to transfer a plurality of data records from a source to a destination storage system and when a specific record of such first task fails to be transferred to the destination storage system. The first task is caused to retry transferring of the specific record to the destination storage system so that such retry is only performed a predefined number of times. When the first task has been caused to retry transferring of a specific record of the first task more than the predefined number of times, the specific record is stored in an error log for a later transfer attempt.

In a specific implementation, operations (a) and (b) are repeated for each of a plurality of substantially identical tasks that are configured by a job for transferring data record sets to the destination system, wherein each task is configured to transfer an individual, different data record set. In a further aspect, the job is a restart of such job. In this aspect, it is determined for each task whether the task is identified as completing. Additionally for each task, if it is determined that the task is identified as completing, the task is stopped so as to inhibit data transfer for such task and performance of operations (a) and (b) for the task. In another aspect, when each task ends, the failed records in the error log is used as input to one or more of the tasks after a predetermined time period so that the transfer of the failed records is retried. In a specific implementation, using the failed records in the error log is accomplished by apportioning each of the failed records to a specific one of the tasks in which such failed record previously failed. In another embodiment, the predetermined time period is an average recovery time for a temporary record failure.

In another embodiment, it is periodically determined whether the first task's failure rate is above a predetermined threshold. If the first task is determined to be above the predetermined threshold, the first task is short-circuited by inhibiting further transfer by the first task and identifying the first task as being short-circuited.

In another embodiment, the invention pertains to an apparatus having at least a processor and a memory. The processor and/or memory are configured to perform one or more of the above described operations. In another embodiment, the invention pertains to at least one computer readable storage medium having computer program instructions stored thereon that are arranged to perform one or more of the above described operations.

These and other features of the present invention will be presented in more detail in the following specification of certain embodiments of the invention and the accompanying figures which illustrate by way of example the principles of the invention.

DETAILED DESCRIPTION OF THE SPECIFIC EMBODIMENTS

Figure 1:
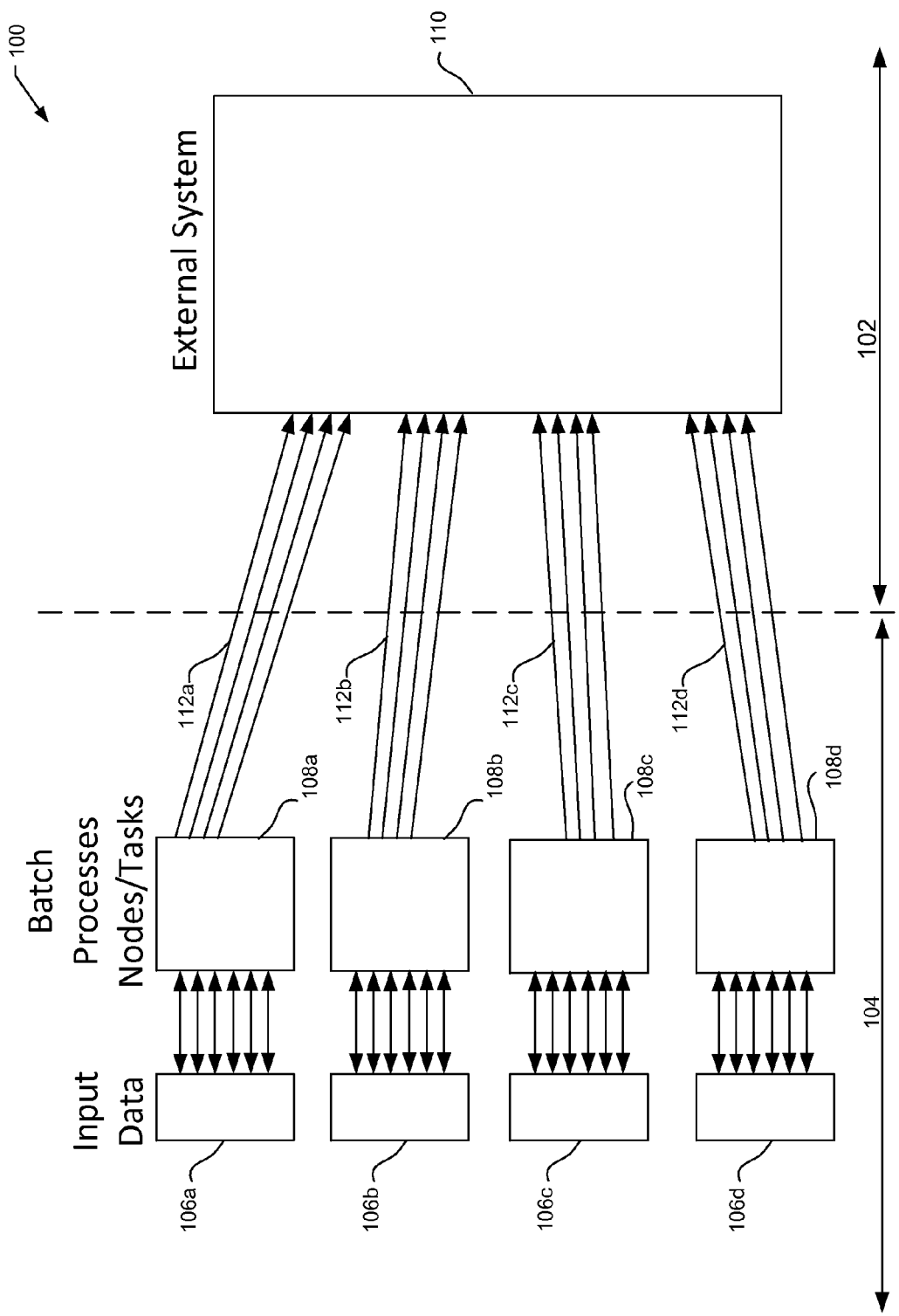
FIG. 1 is a diagrammatic representation of a portion of a distributed processing system for orchestrating large-scale, long-running data transfer in accordance with one example.

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

To facilitate large data batch processing, a number of companies and institutions have developed distributed processing systems. A distributed processing system generally includes a high number of processing nodes running on clusters of multiple machines. The multiple processing nodes can implement large-scale data batch processing that is run in parallel over a large distributed system. These distributed processing systems generally provide greater reliability, throughput, and processing power than traditional data processing systems. Machines can be added to each cluster as needed, allowing the processing capability to grow as large as desired. Examples of large-scale data transfer systems include Apache Software Foundation's Hadoop (map/reduce), SQL (structured query language), Pig, or Hive, among others. SQL is a declarative language for talking to databases, so could be instructed to read/write at a large scale. Pig and Hive are high-level languages that compile to map/reduce.

A distributed processing system can be used for any number of applications or "jobs", which may benefit from massive parallel processing of data. This type of system makes it easy to run massive data processing jobs. A job can specify input format, one or more tasks to be executed on such input, and output format. The tasks for receiving a particular set of input can be duplicated across the processing nodes, and each node can be transparently provided with a input portion of the specified input data and so that the task can process and output a portion of the specified output data. In a specific example, a set of processing nodes can receive the web pages from an Internet web crawling process, and each node receives a portion of this web page data and then independently counts and outputs the number of times particular words appear in its own portion of web page data. That is, the nodes/tasks work independent of each other. The results from each node/task can then be received and reduced by another set of processing nodes, which output a non-repetitive output.

Such a distributed system also can be utilized for analyzing a large amount of data for various purposes. For instance, a variety of user data can be analyzed to determine various types of user models based on various user characteristics (e.g., location, interests, age, gender, occupation, etc.).

In a cloud computing environment, a distributed processing system may provide the output data to a publicly available cloud network system or another private data processing system. Alternatively, the output data may be provided to a storage system that makes only a portion of the data available to other users. At some point in the execution of a distributed processing application, a set of nodes of the distributed processing system can receive input data (original or generated by other nodes) and output the data to an external system. The data source system and data destination system can utilize any type of data retrieval and storage format, such as the Hadoop Data Filing System (HDFS), Sherpa, mem-cached, MySQL, etc.

FIG. 1 is a diagrammatic representation of a portion of a distributed processing system 100 for orchestrating large-scale, long-running data transfer in accordance with one example. This example system 100 includes a data store and serving portion 102 and a distributive data processing portion 104. On the data processing side 104, data is received, processed, and then output data is transferred to an external system, e.g., 110, of the data store portion 102.

The distributive data processing system 104 can include any number of nodes for performing any number and type of tasks, such as partitioning input data and distributing to other processing nodes, processing input data and generating output data, data transfer, etc. For example, the nodes can be used to execute complex workflows or jobs to transform incoming raw data feeds (e.g. web crawls, telescope images) into refined, structured data products (e.g. web entity-attribute-relationship graphs, sky object databases). These workflows can operate over vast quantities of data, which arrives in large waves. The data can be processed in a batch or incrementally.

In the illustrated embodiment, only a set of data transfer tasks/nodes 108a~108d of the distributed system 104 is shown although such system would typically include other types of tasks/nodes. Although each task is shown on a separate node, a plurality of tasks may be implemented on a single node device. The set of batch processing nodes/tasks are illustrated as receiving particular portions (e.g., 106a~106d) of the input data. The input data may be provided by other tasks/nodes (not shown) of the distributed data processing system, direct user data from various service interactions, e.g., with particular service applications on the Internet, indirect user feedback, etc. By way of specific examples, input data can be a plurality of records that each includes an advertisement model for a specific user, blog entries/news articles from external sources, data sets containing items for sale that are aggregated/enriched and then made searchable on a webpage, etc.

An external system can generally be defined as a system that processes or stores data that is output from the "internal" processing nodes. By way of examples, an external system can take the form of a data center system, cloud system, etc. Another definition for "external system" can simply be a system that serves as a destination for data that is output from a distributed processing system, which handles a large number of records (e.g., 100's of gigabytes (GB) or more of data). Typically, the internal system will operate differently than the external system, e.g., the systems will have different processes. In certain embodiments, the internal system generally cannot perform quick lookups as compared with the external system. That is, a single system cannot be optimized to perform both quick data access functions and massive data processing functions well. Thus, a massive data analysis process may be separated from a quick data-lookup process. However, the present invention does not preclude an integration of such functions into a single distributed processing system.

In the example of FIG. 1, the data store and serving portion 102 generally provides infrastructure for applications to quickly and frequently serve processed output data for a wide range of purposes. For example, a search algorithm can access a specific user model to determine relevant pages to present to a particular search user. In another example, an advertisement algorithm can access specific user models to determine which advertisements to present to specific users as such users interact with various web pages in real time. In another example, a shopping web page can access a small range of items, matching specific criteria (e.g. price, item category). Thus, the data store and serving portion 102 will typically be set up to provide quick and frequent access.

Turning back to the distributive data processing portion 104, a job for handling a large amount of data can utilize a high number of tasks, e.g., 1000's of tasks. Thus, if a single task or the machine that runs a task fails, this task can simply be restarted under certain circumstances. Since only $\frac{1}{1000}$ of the tasks are restarted, this restart can have an insignificant effect on the job as a whole.

However, this type of "retry" model may cause problems when errors occur when transferring data from a distributed processing system to an external, storage system. One type of error that can occur with respect to an external system is a mis-configuration error. For instance, an application may instruct a batch process to incorrectly configure its output data (e.g., 112a~d) to the external system. In this case, every write to the external system will fail. For example, an incorrect machine name or misspelling of the machine name of an external machine may be used for writing out data. If all of the failing data were to be simply reinserted, this retry approach would again result in all writes failing.

Another type of error is a system error. Although a system error may occur after a period of time, the system error entails failure of all write attempts. The configuration for writing output data may be correct. However, an external machine may fail after a period of time, even though the output has been initially configured to go to the correct external machine. Another system failure is a network partition that causes the external machine to no longer be reachable (e.g., an external data center becomes unreachable).

Other types of failures may result in only a subset of failed write attempts for a particular task, but not a failure for all write attempts as the mis-configuration and system error types. A bad record error may occur when there is a problem with a particular record, e.g., formatted incorrectly for the external storage or serving system. In a bad record situation, the particular data transfer task may fail to insert only the bad record while successfully inserting other records. If a retry was attempted for a bad record, the attempt would always fail. In contrast, another type of occasional error is an itinerate error that succeeds after one or more retries. For example, the record is correct, but the external system times out or becomes temporarily overloaded and gives an error for a particular set of record insertion attempts.

One simple solution for handling errors is to log the failed records to a file for later insertion. However, if all writes are going to fail all the time, this approach can become a waste of time and disk space. While logging occasional failures is preferred, other failure handling also needs to be performed for other types of errors. In a specific implementation, if a high percentage of a task's output (e.g., writes to another data storage system) is failing, the task short-circuits itself. The task can also be configured to do checkpoint logging as the task completes work. If the entire job later short-circuits and is to be restarted, the restarted job only repeats a minimal amount of previously completed work for the tasks which have not already completed their data insertions. Together, these techniques can ensure that in the face of periodic failures, the job completes long-running job in a minimal time with minimal effects.

Figure 2:
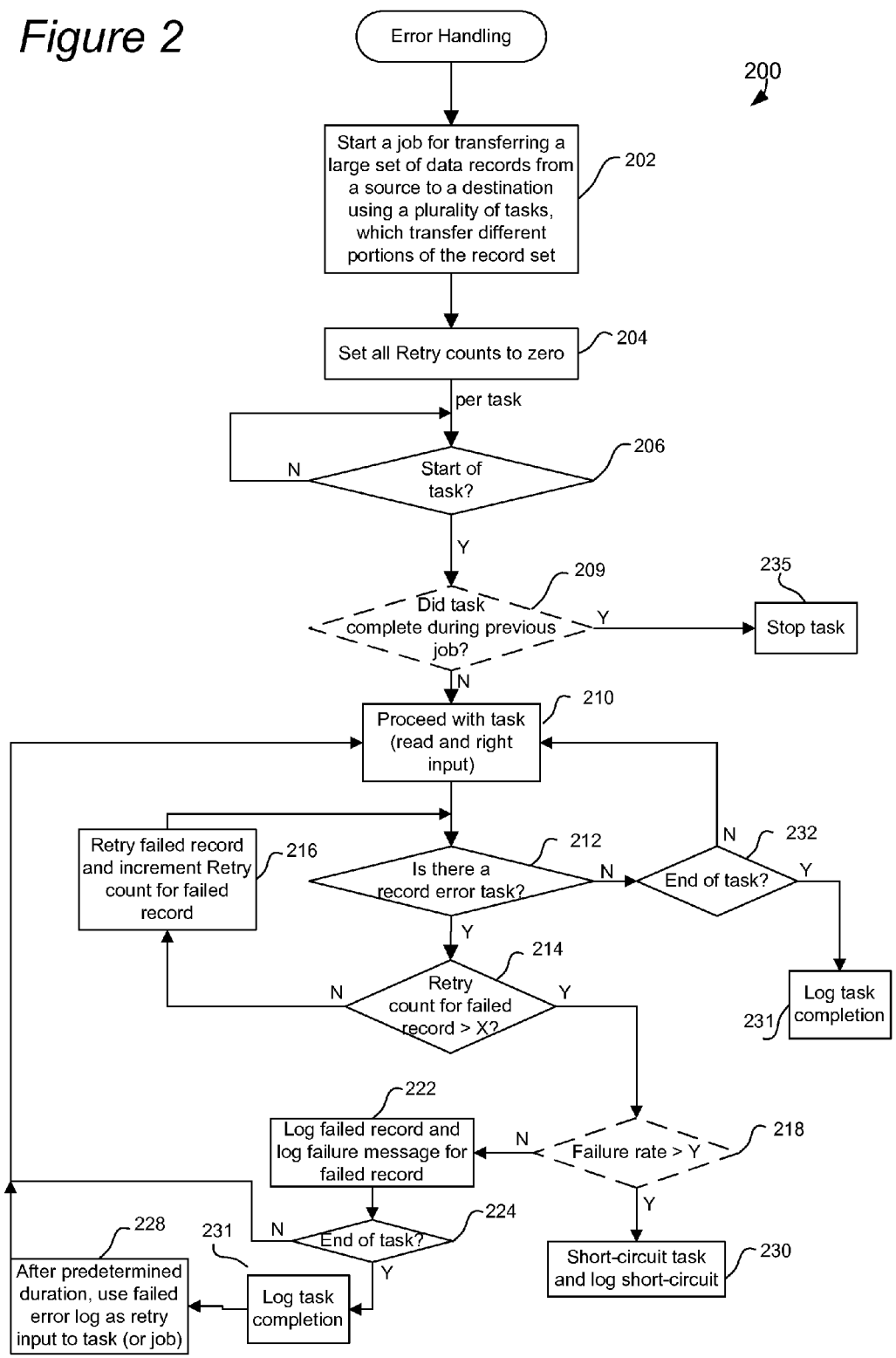
FIG. 2 is a flow chart illustrating an error handling procedure in accordance with one embodiment of the present invention.

FIG. 2 is a flow chart illustrating an error handling procedure in accordance with one embodiment of the present invention. Initially, a job for transferring a large set of data records from a source to a destination may be started in operation 202. In a cloud type or distributed data processing system, the transfer of individual portions of such data records may be accomplished by plurality of identical tasks, which each transfer data records from the source to the destination. A set of Retry counts may also be set to zero in operation 204.

In the illustrated example, a process for a single task will now be described although such process is applied to all tasks in the system. It may be determined whether the particular task has started in operation 206. The process continues to wait. When the task has started (and optionally it is determined that the task has not previously completed in operation 209), the task may proceed with reading and writing its apportioned input in operation 210. If the task is determined to have completed during a previous job (e.g., the current job is a restart job) in operation 209, the task process is simply stopped. That is, data transfer and error handling are inhibited for the current task.

After the task starts, it may then be determined whether a record error has occurred in operation 212. For example, as input records are read from the source and written to the source, one of the records may have either a permanent or intermittent failure (e.g., fails to write to the external system). Additionally, all records could be failing for the particular task (as well as the entire job). If there is a record error, the record may be retried and the Retry count incremented in operation 216. Record retry need not occur after each record failure, but may occur for a set of failed records.

A retry limit is preferably enforced to prevent the process from continually attempting to insert a bad record (or set of bad records) or wasting time during the intermittent failure duration. Thus, it may also be determined whether the Retry count is above a predefined number (X), e.g., only 3 retries will be attempted, in operation 214. If the Retry count is above the predefined number, the failed record may be logged for later attempts (e.g., for itinerate errors), as well as any corresponding error messages, in operation 222.

Figure 3:
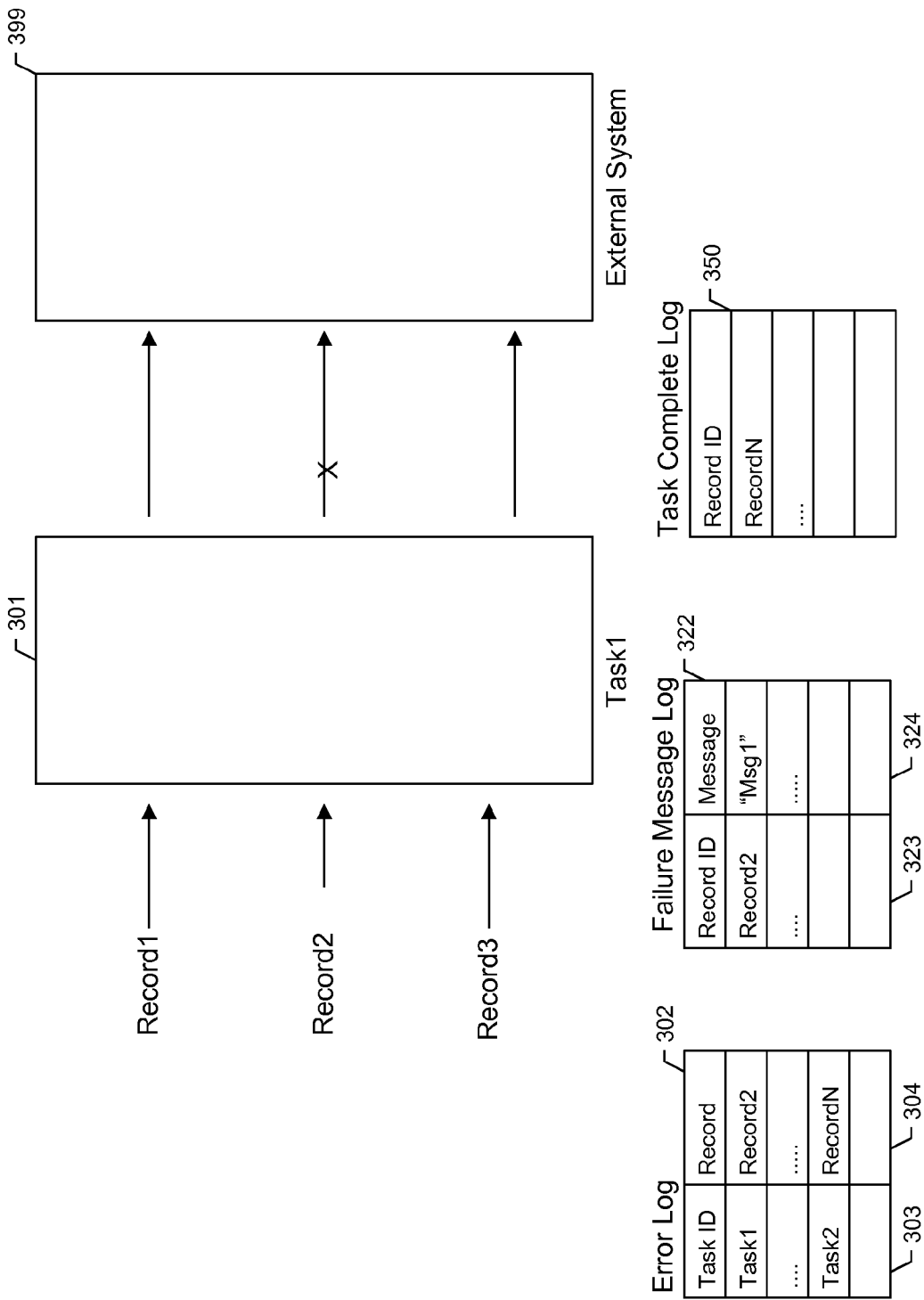
FIG. 3 is a diagrammatic representation of a plurality of logs for managing errors in a large-scale, long-running data transfer in accordance with a specific implementation.

FIG. 3 is a diagrammatic representation of a plurality of logs for managing errors in a large-scale, long-running data transfer in accordance with a specific implementation. As shown, a Task1 301 successfully transfers Record1 and Record2 to external system 399. However, Record2 is not successfully written. After a retry limit is reached, this Record2 may be logged into Error Log 302 having any number of fields, such as a task identifier and a copy of the record. Alternatively, the Error Log may simply hold the failed record copies. The Error Log may also include failed records from other tasks of the same job (e.g., RecordN). This same log may also contain any specific error message that are generated or received (e.g., from the external system) to facilitate troubleshooting. In the illustrated example, a separate Failure Message Log 322 is utilized to store any number of fields, such as the failed record identifier 323 and a corresponding error message 324. Other parameters, such as corresponding task identifier, may also be logged. Alternatively, the error messages may simply be logged without any other information.

To prevent an inordinate amount of record errors being logged (e.g., for system or mis-configuration type errors), it may be determined whether a failure rate for the task has exceeded a predetermined amount (Y), e.g., record failure rate >10%, in operation 218. This failure rate determination may occur after each record fail or after a predefined time period. If the predefined failure rate threshold has been exceeded, the task may be short-circuited and such short-circuit may be logged for later use in operation 230. This short-circuit log (as well as any of the other logs) may be used to determine error causes and to troubleshoot the system.

If the failure rate has not been exceeded (or the success rate has remained below the predefined threshold), it may at this point be determined whether the task is ending in operation 224. For example, it may be determined whether the last failed input record has been attempted. If the end has not been reached, the task may continue to transfer input records from a source to a destination in operation 210.

Upon a task ending (or upon a job ending), the task may be logged as completed in operation 231. The logged input records that have been written to an error log may be later used. After a predetermined duration (e.g., corresponds to average intermittent record problem duration), the error log may be used to as retry input to the task in operation 228, and the task proceeds with this new retry input. Alternatively, the error logs for all the completed tasks of a particular job may be collected and resubmitted in a new job, which is configured to divide the error records among a plurality of tasks (which may vary from the initial number of tasks).

When a job has to be restarted (e.g., after a system or mis-configuration error is fixed), reinsertion of record data by one or more tasks is preferably minimized for the job. In one implementation, when a task completes, the task may be logged as completed in operation 231. For instance, a unique identifier is written for the particular task. In one embodiment, the first input record for the task is written to a task completion log. As shown in FIG. 3, an initial RecordN for task2 has been successfully retried, as well as all the other records for task2. Accordingly, RecordN is listed in a Task Complete Log 350. Record1 and Record2 retries for task1 have failed. Thus, this first record for task1 is not listed in such Log 350.

In a specific example, a system or mis-configuration error has occurred in the middle of a first task's data insertion and after a second task's insertion is completed. As a result, the first task will not be logged in the Task Completion Log 350, but the first record of the second task will be logged in such Log 350.

Upon restart of the same task, it may then be determined whether such task has already completed during the previous job in operation 209. For instance, it may be determined whether the current task has been identified as being completed (e.g., by its first record being found in the task completion log). If the task has already completed, the task may simply be stopped in operation 235. Thus, the records for a completed task are not reinserted for a restarting job.

Figure 4:
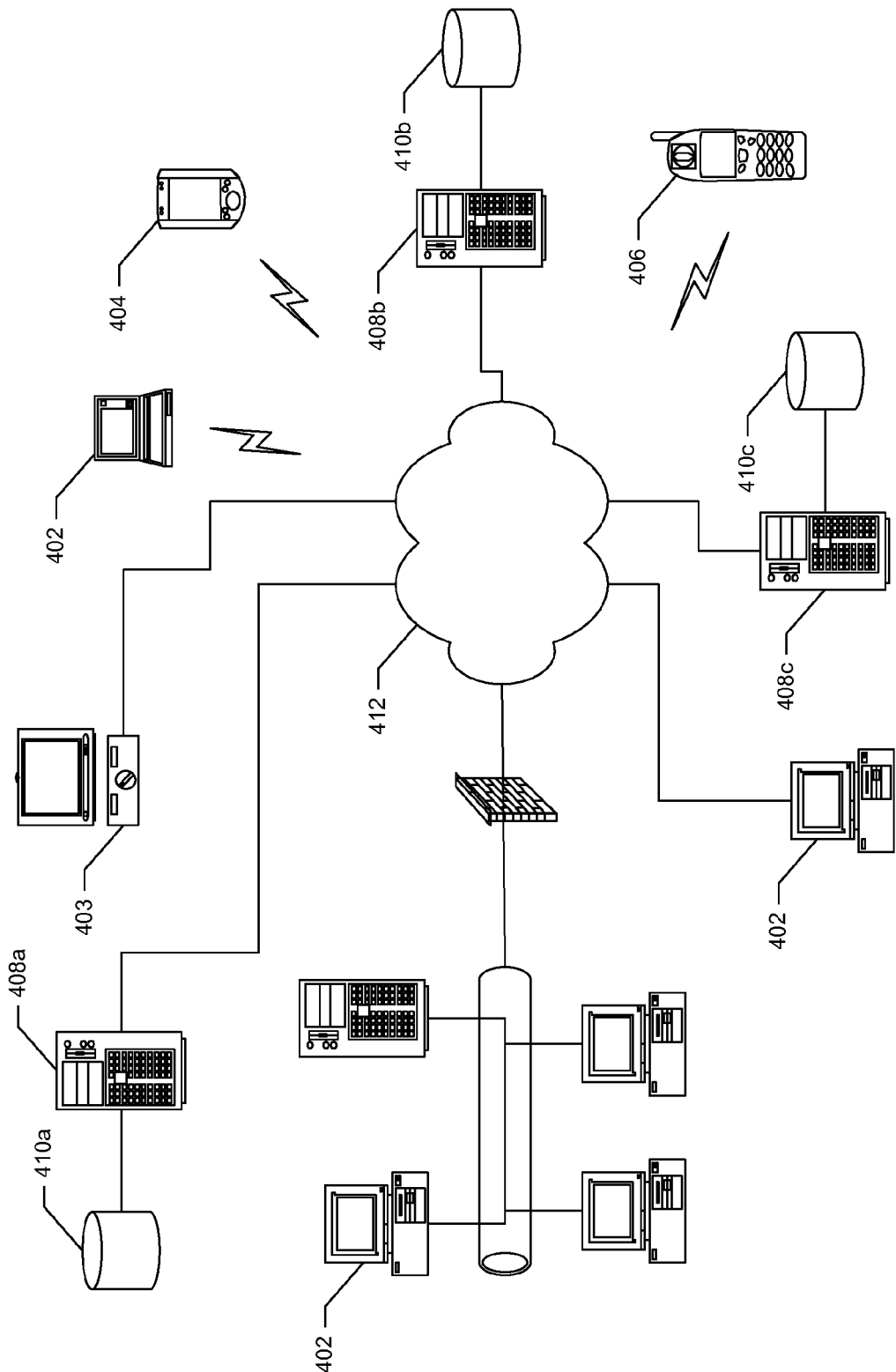
FIG. 4 is a simplified diagram of a network environment in which specific embodiments of the present invention may be implemented.

Embodiments for error handling may be employed in a wide variety of diverse computing contexts. For example, as illustrated in FIG. 4, implementations are contemplated in which the relevant population of users interact with a diverse network environment via any type of computer (e.g., desktop, laptop, tablet, etc.) 402, media computing platforms 403 (e.g., cable and satellite set top boxes and digital video recorders), handheld computing devices (e.g., PDAs) 404, cell phones (camera phones with GPS) 406, or any other type of computing or communication platform.

And according to various embodiments, data that is processed in accordance with the invention may be obtained using a wide variety of techniques. For example, a user's interaction with a local application, web site or web-based application or service may be accomplished using any of a variety of well known mechanisms for managing data. However, it should be understood that such methods of obtaining data are merely exemplary and that data may be collected in many other ways.

Distributed data processing and/or error handling may be handled according to the invention in some centralized manner. This is represented in FIG. 4 by server 408 and data store 410 that, as will be understood, may correspond to multiple distributed devices and data stores. Embodiments of the present invention may also be practiced in a wide variety of network environments (represented by network 104) including, for example, TCP/IP-based networks (e.g., Rate Control Protocol or RCP, Transport Control Protocol or TCP, Fast TCP, Stream-based TCP/IP or STCP, eXplicit Control Protocol or XCP, etc.), telecommunications networks, wireless networks, mobile networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

Systems for error handling may be implemented on one or more computer systems. For instance, a computer system may include any number of processors (also referred to as central processing units, or CPUs) that are coupled to storage devices including primary storage (typically a random access memory, or RAM), primary storage (typically a read only memory, or ROM). The CPU may be of various types including microcontrollers and microprocessors such as programmable devices (e.g., CPLDs and FPGAs) and unprogrammable devices such as gate array ASICs or general-purpose microprocessors. As is well known in the art, primary storage can act to transfer data and instructions uni-directionally to the CPU and primary storage can be used typically to transfer data and instructions in a bi-directional manner. Both of these primary storage devices may include any suitable computer-readable media such as those described herein. A mass storage device may be also coupled bi-directionally to a CPU and provides additional data storage capacity and may include any of the computer-readable media described herein. A mass storage device may be used to store programs, data and the like and is typically a secondary storage medium such as a hard disk. It will be appreciated that the information retained within a mass storage device, may, in appropriate cases, be incorporated in standard fashion as part of primary storage as virtual memory. A specific mass storage device such as a CD-ROM may also pass data uni-directionally to the CPU.

Each CPU can also be coupled to an interface that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, each CPU optionally may be coupled to an external device such as a database or a computer or telecommunications network using an external connection. With such an external connection, it is contemplated that a CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store record data, Retry counts and thresholds, task success rate thresholds, failed record copies, error messages, task completion logs, short-circuit logs, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For example, the inventive techniques can be applied to a single task or node for transferring a plurality of records (e.g., non-distributive data transfer) although embodiments of error handling are described above as being implemented with respect to a plurality of tasks/nodes for a particular data transfer job. Therefore, the present embodiments are to be considered as illustrative and not restrictive and the invention is not to be limited to the details given herein, but may be modified within the scope and equivalents of the appended claims.

What is claimed is:

1. A computer implemented method of handling errors during a data transfer, comprising:
    (a) for a first task that is configured to transfer a plurality of data records from a source to a destination storage system and when a specific record of such first task fails to be transferred to the destination storage system, causing the first task to retry transferring of the specific record to the destination storage system so that such retry is only performed a predefined number of times;
    (b) when the first task has been caused to retry transferring of a specific record of the first task more than the predefined number of times, storing the specific record in an error log for a later transfer attempt;
    (c) periodically determining whether the first task's failure rate is above a predetermined threshold; and (d) if the first task's failure rate is determined to be above the predetermined threshold, short-circuiting the first task by inhibiting further transfer by the first task and identifying the first task as being short-circuited.

2. The method as recited in claim 1, wherein causing the first task to retry transferring of the specific record to the destination storage system so that such retry is only performed a predefined number of times is accomplished by (i) prior to starting the first task, initializing a retry count for such specific record, (ii) for each first task's failure to transfer the specific record and prior to causing the first task to retry transferring such specific record, determining whether the retry count for such specific record has reached a first threshold, and (iii) for each first task's failure to transfer the specific record, causing the first task to retry transferring such specific record and incrementing the specific record's retry count if it is determined that the specific record's retry count has not reached the first threshold, otherwise, inhibiting the first task from being caused to retry transferring of such specific record.

3. The method as recited in claim 2, wherein operations (a) and (b) are repeated for each of a plurality of substantially identical tasks that are configured by a job for transferring data record sets to the destination system, wherein each task is configured to transfer an individual, different data record set and wherein the job is a restart of such job, and the method further comprises:
for each task, determining whether the task is identified as completing; and
for each task, if it is determined that the task is identified as completing, stopping the task so as to inhibit data transfer for such task and performance of operations (a) and (b) for the task.

4. The method as recited in claim 3, further comprising:
when each task ends, using the failed records in the error log as input to one or more of the tasks after a predetermined time period so that the transfer of the failed records is retried.

5. The method as recited in claim 4, wherein using the failed records in the error log is accomplished by apportioning each of the failed records to a specific one of the tasks in which such failed record previously failed.

6. The method of claim 4, wherein the predetermined time period is an average recovery time for a temporary record failure.

7. An apparatus comprising at least a processor and a memory, wherein the processor and/or memory are configured to perform the following operations:
(a) for a first task that is configured to transfer a plurality of data records from a source to a destination storage system and when a specific record of such first task fails to be transferred to the destination storage system, causing the first task to retry transferring of the specific record to the destination storage system so that such retry is only performed a predefined number of times;
(b) when the first task has been caused to retry transferring of a specific record of the first task more than the predefined number of times, storing the specific record in an error log for a later transfer attempt;
(c) periodically determining whether the first task's failure rate is above a predetermined threshold; and
(d) if the first task's failure rate is determined to be above the predetermined threshold, short-circuiting the first task by inhibiting further transfer by the first task and identifying the first task as being short-circuited.

8. The apparatus as recited in claim 7, wherein causing the first task to retry transferring of the specific record to the destination storage system so that such retry is only performed a predefined number of times is accomplished by (i) prior to starting the first task, initializing a retry count for such specific record, (ii) for each first task's failure to transfer the specific record and prior to causing the first task to retry transferring such specific record, determining whether the retry count for such specific record has reached a first threshold, and (iii) for each first task's failure to transfer the specific record, causing the first task to retry transferring such specific record and incrementing the specific record's retry count if it is determined that the specific record's retry count has not reached the first threshold, otherwise, inhibiting the first task from being caused to retry transferring of such specific record.

9. The apparatus as recited in claim 8, wherein operations (a) and (b) are repeated for each of a plurality of substantially identical tasks that are configured by a job for transferring data record sets to the destination system, wherein each task is configured to transfer an individual, different data record set and wherein the job is a restart of such job, and the processor and/or memory are further configured:
for each task, determining whether the task is identified as completing; and
for each task, if it is determined that the task is identified as completing, stopping the task so as to inhibit data transfer for such task and performance of operations (a) and (b) for the task.

10. The apparatus as recited in claim 9, wherein the processor and/or memory are further configured:
when each task ends, using the failed records in the error log as input to one or more of the tasks after a predetermined time period so that the transfer of the failed records is retried.

11. The apparatus as recited in claim 10, wherein using the failed records in the error log is accomplished by apportioning each of the failed records to a specific one of the tasks in which such failed record previously failed.

12. The apparatus of claim 10, wherein the predetermined time period is an average recovery time for a temporary record failure.

13. A computer program product for partitioning a native table in a database, comprising at least one computer-readable non-transitory medium having computer instructions stored therein which are operable to cause a computer device to perform the following operations:
(a) for a first task that is configured to transfer a plurality of data records from a source to a destination storage system and when a specific record of such first task fails to be transferred to the destination storage system, causing the first task to retry transferring of the specific record to the destination storage system so that such retry is only performed a predefined number of times;
(b) when the first task has been caused to retry transferring of a specific record of the first task more than the predefined number of times, storing the specific record in an error log for a later transfer attempt;
(c) periodically determining whether the first task's failure rate is above a predetermined threshold; and
(d) if the first task's failure rate is determined to be above the predetermined threshold, short-circuiting the first task by inhibiting further transfer by the first task and identifying the first task as being short-circuited.

14. The computer program product as recited in claim 13, wherein causing the first task to retry transferring of the specific record to the destination storage system so that such retry is only performed a predefined number of times is accomplished by (i) prior to starting the first task, initializing a retry count for such specific record, (ii) for each first task's failure to transfer the specific record and prior to causing the first task to retry transferring such specific record, determining whether the retry count for such specific record has reached a first threshold, and (iii) for each first task's failure to transfer the specific record, causing the first task to retry transferring such specific record and incrementing the specific record's retry count if it is determined that the specific record's retry count has not reached the first threshold, otherwise, inhibiting the first task from being caused to retry transferring of such specific record.

15. The computer program product as recited in claim 14, wherein operations (a) and (b) are repeated for each of a plurality of substantially identical tasks that are configured by a job for transferring data record sets to the destination system, wherein each task is configured to transfer an individual, different data record set and wherein the job is a restart of such job, and wherein the computer instructions are further operable to cause a computer device to perform the following operations:

for each task, determining whether the task is identified as completing and for each task, if it is determined that the task is identified as completing, stopping the task so as to inhibit data transfer for such task and performance of operations (a) and (b) for the task.

16. The computer program product as recited in claim 15, wherein the computer instructions are further operable to cause a computer device to perform the following operations:

when each task ends, using the failed records in the error log as input to one or more of the tasks after a predetermined time period so that the transfer of the failed records is retried.

17. The computer program product as recited in claim 16, wherein using the failed records in the error log is accomplished by apportioning each of the failed records to a specific one of the tasks in which such failed record previously failed.

18. The computer program product of claim 16, wherein the predetermined time period is an average recovery time for a temporary record failure.

* * * * *